United States Patent
Rugnone

(10) Patent No.: US 12,203,795 B2
(45) Date of Patent: Jan. 21, 2025

(54) METHOD AND SYSTEM FOR MEASURING A LIQUID LEVEL IN A PRESSURE VESSEL OF A UREA SYNTHESIS PLANT

(71) Applicant: Casale SA, Lugano (CH)

(72) Inventor: Luca Rugnone, Como (IT)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 16/764,726

(22) PCT Filed: Nov. 6, 2018

(86) PCT No.: PCT/EP2018/080264
§ 371 (c)(1),
(2) Date: May 15, 2020

(87) PCT Pub. No.: WO2019/096623
PCT Pub. Date: May 23, 2019

(65) Prior Publication Data
US 2021/0172785 A1    Jun. 10, 2021

(30) Foreign Application Priority Data
Nov. 16, 2017 (EP) .................. 17202123

(51) Int. Cl.
*G01F 23/284* (2006.01)
*G01S 13/88* (2006.01)

(52) U.S. Cl.
CPC ........... *G01F 23/284* (2013.01); *G01S 13/88* (2013.01); *Y02P 20/54* (2015.11)

(58) Field of Classification Search
CPC .............................. G01F 23/284; G01S 13/88
See application file for complete search history.

(56) References Cited

U.S. PATENT DOCUMENTS

| 5,827,985 A | 10/1998 | Grieger et al. | |
| 6,915,689 B2 * | 7/2005 | Edvardsson | H01Q 13/02 324/637 |
| 7,334,451 B1 * | 2/2008 | Fauveau | G01F 23/284 73/1.73 |

(Continued)

FOREIGN PATENT DOCUMENTS

| CN | 104422494 A | 3/2015 |
| EP | 0 544 056 A1 | 6/1993 |

(Continued)

OTHER PUBLICATIONS

Eleventh Stamicarbon Urea Symposium 2008, Bart Gevers, Senior Engineer Urea Process, Jan Mennen, Principal Engineer Urea Process, Jo Meessen, Principal Engineer Urea Process, Stamicarbon B.V., the Netherlands, 2008 (Year: 2008).*

(Continued)

*Primary Examiner* — Timothy A Brainard
*Assistant Examiner* — Ismaaeel A. Siddiquee
(74) *Attorney, Agent, or Firm* — Akerman LLP

(57) ABSTRACT

A method and system for measuring a liquid level in a pressure vessel, the method comprising: transmitting an electromagnetic signal through a wave guide in the form of an elongate solid rod (5) with bottom end immersed in the liquid and detecting a signal generated by the reflection on the surface of the liquid.

21 Claims, 2 Drawing Sheets

(56) References Cited

U.S. PATENT DOCUMENTS

| | | | | |
|---|---|---|---|---|
| 7,498,464 | B2* | 3/2009 | Kojima | C07C 273/04 564/72 |
| 9,541,443 | B2* | 1/2017 | Edvardsson | G01S 7/02 |
| 9,551,607 | B2* | 1/2017 | Riegman | G01F 23/284 |
| 10,434,468 | B2 | 10/2019 | Carlessi | C07C 273/04 |
| 2001/0050629 | A1* | 12/2001 | Benway | G01S 13/88 342/204 |
| 2002/0027001 | A1* | 3/2002 | Wellington | E21B 36/04 166/59 |
| 2004/0145510 | A1* | 7/2004 | Edvardsson | H01Q 15/006 342/124 |
| 2005/0241391 | A1 | 11/2005 | Kull | |
| 2009/0302867 | A1 | 12/2009 | Schroth et al. | |
| 2012/0242532 | A1 | 9/2012 | Fouarge et al. | |
| 2013/0314275 | A1* | 11/2013 | Fredriksson | G01S 13/08 342/124 |
| 2014/0085130 | A1 | 3/2014 | Edvardsson | |
| 2014/0104099 | A1 | 4/2014 | Janitch | |
| 2014/0191898 | A1 | 7/2014 | Riegman | |
| 2015/0068113 | A1* | 3/2015 | Conner | C10L 5/44 204/157.43 |
| 2016/0334262 | A1* | 11/2016 | Haran | G01S 13/08 |
| 2019/0057879 | A1* | 2/2019 | Delmas | H01L 21/67109 |

FOREIGN PATENT DOCUMENTS

| | | | | |
|---|---|---|---|---|
| EP | 2631611 A1 * | 8/2013 | | G01F 23/284 |
| EP | 3296736 A1 | 3/2018 | | |
| WO | 98/08808 A1 | 3/1998 | | |
| WO | 2009/064248 A1 | 5/2009 | | |
| WO | 2010/071564 A1 | 6/2010 | | |
| WO | 2013/036108 A1 | 3/2013 | | |
| WO | 2017005802 A1 | 1/2017 | | |

OTHER PUBLICATIONS

Anonymous, "Technical Information Levelflex M FMP41C, FMP45," Jan. 1, 2009, pp. 1-52.
International Search Report issued in connection with PCT/EP2018/080264.
International Preliminary Report on Patentability issued in connection with PCT/EP2018/080264.
Endress+Hauser Manufacturer Statement.
Operating Instructions, Levelflex M FMP45, Guided Level Radar for Interface Measurement.
Technical Information, Levelflex M FMP41C, FMP45, Guided Level-Radar.
Coding System for Documentation, Endress+Hauser.
Special Version Documentation, Levelflex FMP54 for Urea Applications.
Technical Information, Levelflex FMP51, FMP52 and FMP54, Guided Level-Radar, Level and Interface Measurement in Liquids.
Description of Device Parameters, Levelflex FMP5x, HART, Guided Wave Radar.
Rosemount, The Engineer's Guise to Level Measurement, 2013 Edition, Emerson Process Management.
Krolak, Adam, "Know Hwn to Use Guided Wave Radar," Chemical Processing.
Migliore, Matt, "How Guided Wave Radar Level Measurement Works," Process Instrumentation, The Measurement of Process Parameters.
Meessen, Jozef H., "Urea," Ullmann's Encyclopedia of Industrial Chemistry, 2012, Wiley-VCH Verlag GmbH & Co.
Heijnen, Leon, "Eleventh Stamicarbon Urea Symposium 2008," Stamicarbon, 11th Stamicarbon Urea Symposium, May 19-22, 2008, Noordwijk.

* cited by examiner

METHOD AND SYSTEM FOR MEASURING A LIQUID LEVEL IN A PRESSURE VESSEL OF A UREA SYNTHESIS PLANT

CROSS-REFERENCE TO RELATED APPLICATIONS

This application is a national phase of PCT/EP2018/080264, filed Nov. 6, 2018, and claims priority to EP 17202123.0, filed Nov. 16, 2017, the entire contents of both of which are hereby incorporated by reference.

FIELD OF THE INVENTION

The invention relates to a method and system for measuring a liquid level in a pressure vessel of a urea synthesis plant, particularly when the vessel contains a gaseous phase at a high pressure and possibly in a supercritical condition above the liquid level. The invention is applicable in the field of equipment for urea synthesis process and particularly preferably in a urea synthesis reactor.

PRIOR ART

Measuring the level of a liquid in a pressure vessel of a chemical plant, such as a reactor or a gas-liquid separator, is regularly desired, for example for the purpose of controlling the process.

One of the known techniques for measuring the liquid level in a chemical reactor includes sending an electromagnetic wave, such as radio wave, towards the liquid, and detecting the echo wave reflected by the surface of the liquid. The elapsed time between the emittance of the signal and detection of the echo gives the distance of the liquid level from the radio source. This technique is also termed radar (radio detection and ranging) level measurement.

Radar measurement, however, is affected by the permeance of the fluid above the liquid. The permeance denotes the ability of the fluid to allow passage of matter or energy.

It has been noted that the signal to noise (S/N) ratio of a radar method may be unsatisfactory when a relatively dense phase exist above the liquid level. Examples of a dense phase which can affect the measure include a supercritical phase and/or a mist. The radar method suffers the drawback of scattering induced by the fluid above the liquid level (so called Tyndall effect).

In a urea synthesis plant, measuring a liquid level in a pressure vessel is a particularly challenging task due to the high operating pressure of the urea synthesis equipment, the temperature and pressure close to or above critical value (particularly in the urea synthesis reactor), and the presence of corrosive fluids such as ammonium carbamate.

An overview of the known technique and equipment for the synthesis of urea can be found in the Ullmann's Encyclopedia of Industrial Chemistry, Wiley-VCH Verlag. Most modern urea processes use a high-pressure synthesis loop involving a reactor, a stripper and a condenser operating at a high pressure of around 130 to 160 bar.

Typically, ammonia and carbon dioxide react to form urea at 130 to 160 bar and 180 to 200° C. The synthesis of urea comprises the formation of ammonium carbamate and the conversion (dehydration) of said ammonium carbamate to urea and water. The reactor effluent contains urea, ammonium carbamate, unreacted ammonia and carbon dioxide, and water. This reactor effluent is sent to the stripper where ammonium carbamate is decomposed with the help of heat and possibly of gaseous carbon dioxide as a stripping medium. The liquid effluent of the stripper is a concentrated urea solution which is further treated in one or more recovery sections at a lower pressure. The gaseous phase withdrawn from the stripper is made predominantly of carbon dioxide and ammonia and is sent to the high-pressure condenser where it is condensed to liquid ammonium carbamate and recycled to the reactor.

Each of the above mentioned reactor, stripper and condenser of the high-pressure loop may contain a gas phase and a liquid phase in equilibrium and may require detection of the liquid level inside, that is the boundary between the liquid phase and the gaseous phase.

As mentioned above, however, the temperature and pressure close to supercritical conditions make more difficult to distinguish this boundary, because the physical properties of the gaseous phase tend to approach the properties of the liquid phase.

Probes in direct contact with the process fluid, such as membrane transmitters, suffer the corrosive attack and are not reliable. Therefore, the contactless systems are usually preferred in the urea processes. Good results have been obtained with radioactive probes which, however, introduce safety and health concerns and are being progressively abandoned. The radar level measurement appears a promising technique but the current state of the art is not satisfactory.

For example, in a urea synthesis reactor, the fluid above the liquid level may have a density of more than 100 kg/m$^3$, for example about 130 kg/m$^3$. This dense fluid negatively affects the S/N ratio of radar detection of the liquid level, for the reasons set out above. The presence of a dense gas medium easily leads to formation of a stable misty atmosphere over the gas-liquid interface. Furthermore, the liquid mixture tends to form a foam layer on top of the liquid surface.

It has been proposed to measure the liquid level in a urea reactor with a horn type radar which, however, has a poor efficiency because the signal is dispersed in the large volume of the reactor.

WO 2013/036108 also addresses the problem of measuring the liquid level in a reactor with a supercritical fluid, and more particularly in a urea reactor, and discloses a radar method wherein electromagnetic waves are transmitted into the direction of the liquid using a tube, wherein the tube extends to a bottom end placed above a desired minimum level of the liquid, wherein the end part of the tube is a reflective surface, the tube comprising at least one hole for venting gas and at least one hole for allowing liquid to enter.

However the above technique does not completely solve the above mentioned problems and drawbacks. The provision of a hollow tube aims to maintain the radar waves in a more stable environment, compared to a horn-type radar, however does not eliminate the effect of mist or foam over the liquid. In addition, the installation of a relatively large hollow tube in a urea reactor is an additional cost and the tube may perturb the operation of the reactor itself.

In an attempt to make a tube-guided radar system less sensitive to the above mentioned negative effects (e.g. Tyndall effect), the prior art teaches to increase the frequency of the signal to around 6 GHz or more. However increasing the frequency has the disadvantages of a more expensive equipment. The emitter and receiver, in particular, need be overdesigned. A further disadvantage of the prior art systems is the low energy efficiency. The energy of the signal is rapidly dissipated while the signal freely travels through the gaseous medium and, therefore, the system absorbs more power for operation. The provision of a hollow tube does not solve this problem of low energy efficiency.

Still another issue of a measure of the liquid level in a high-pressure ureq equipment is that the dielectric constant of the vapour phase above the liquid level may be significantly greater than 1. When the vapour phase is at low pressure and far from critical condition, the dielectric constant can be assumed equal to 1 with little error, which means the assumption that an electromagnetic signal travels through the vapour phase at the speed c, wherein c is the speed of light in vacuum.

The above assumption however is no longer valid at a high pressure, particularly when the pressure approaches the critical pressure $p_{cr}$. In such a case, the actual speed of light v in the gaseous medium is inversely proportional to the square root of the dielectric constant $\varepsilon_r$ of the gaseous phase according to the relationship:

$$v \propto \frac{c}{\sqrt{\varepsilon_r}}$$

where the symbol $\propto$ denotes proportionality. Under the above condition the actual speed of the signal is significantly slower than c. The assumption of a speed equal to c would therefore make the liquid level appear lower (more distant from the probe) than actual.

US 2012/0242532 discloses time domain reflectometry (TMR) applied to a method for monitoring the level of an ethylene polymerization catalyst slurry, thus acting at a low pressure and in the presence of a gaseous phase predominantly made of nitrogen at relatively low pressure.

SUMMARY OF THE INVENTION

The invention aims to provide a radar method for detection of the liquid level in a chemical reactor, which is more accurate, efficient and reliable than the prior art radar methods.

One aim of the invention is to provide a radar method which is less sensitive to scattering caused by the fluid above the surface of the liquid. Particularly, one aim of the invention is a radar method which is more accurate in the presence of a near-critical or supercritical fluid above the surface of the liquid. The term of supercritical fluid here denotes a fluid having temperature and pressure above the critical value. The term of near-critical denotes that the temperature and/or the pressure are close to the critical value.

A further aim is a method which is less affected by a dense gaseous phase and/or a foam layer over the liquid-gas interface. A further aim is a method which is more efficient requiring less energy to operate. Still a further aim of the invention is a method suitable for detecting the liquid level in a pressure vessel of a urea plant, particularly in the high-pressure synthesis loop.

The above aims are reached with a method according to claim 1. Further aspects of the invention are recited in the dependent claims.

The method of the invention comprises the step of emitting a first electromagnetic signal from above the liquid level and towards the liquid level, through a wave guide which is an elongate solid rod and extends below the liquid level. The method further comprises detecting a second electromagnetic signal which is generated by the first signal reflected by the surface of the liquid, and determining the liquid level on the basis of the elapsed time between the emission of the first signal and the detection of the second signal.

The gaseous phase contained in the pressure vessel above said liquid level, which is a gaseous phase including ammonia and carbon dioxide, has a pressure equal to or greater than 80 bar and a temperature equal to or greater than 120° C. Preferably the pressure is at least 130 bar or greater, and the temperature is at least 120° C., preferably 140° C. to 210° C. In a pressure vessel of a high-pressure urea synthesis loop, the common pressure and temperature are 140 to 220 bar and 170 to 210° C. The pressure is given in bar gauge (barg).

Said gaseous phase is formed by vapours in equilibrium with the underlying liquid phase. In most common embodiments, said gaseous phase is made predominantly by ammonia and carbon dioxide, the balance being possibly water and non-condensable gases.

The method of the invention uses the solid rod as a wave guide to transmit the signal in the environment above the liquid level. The solid rod is partially immersed in the liquid. When the signal reached the liquid level, travelling on the solid rod wave guide, the partial reflection of the liquid surface generates a second signal travelling the opposite direction. The second signal is also guided by the solid rod wave guide. The second signal is detected and the time of flight of the signal furnishes a measure of the position of the liquid surface, that is of the liquid level.

The determination of the liquid level includes preferably a step of a compensation of the dielectric of the gaseous phase above the liquid level, which may be in a near-critical or supercritical condition.

Preferably said compensation includes the generation of a reference reflection at a known location of the solid rod above the liquid level and calculation of the actual speed of the signal based on said reference reflection. The reference reflection is generated by a change of at least one feature of the rod, for example a change of the diameter of the rod. As the position of the source of the reference reflection is known, the time of flight of the reference reflection compared to an expected time of flight will give the actual speed in the medium. This method accounts for the dielectric constant of the gaseous phase.

The term of solid rod denotes an elongate body which is not hollow. The solid rod wave guide has a cross section which appears connected, i.e. has no hole. According to different embodiments the cross section of the rod wave guide is circular or polygonal, i.e. the rod wave guide can be a cylindrical rod or a square rod or more generally a polygonal rod.

According to different embodiments, the rod wave guide can be straight or curved. In one embodiment, the rod wave guide is a curved rod with a 90° bend. Embodiments with a curved rod facilitate side installation of the system instead of top installation. A side installation with a curved rod is preferred, for example, for use in a urea stripper.

Preferably the lower portion of the rod wave guide is perpendicular to the plane of the liquid level to be measured.

Preferably the first electromagnetic signal which is transmitted through the solid rod wave guide has a frequency of less than 1.5 GHz. Said frequency is preferably 100 MHz to 1.5 GHz, more preferably 100 MHz to 1.2 GHz, even more preferably 100 MHz to 1 GHz. According to some embodiments said frequency is 0.5 to 1 GHz.

The rod wave guide has preferably a length of no more than 5 meters, more preferably no more than 3 meters. According to some embodiments, the rod may have a modular structure comprising comprise several pieces. Preferably, each of said modular pieces of the rod has a length of 500 mm to 2.5 meters.

A particularly preferred embodiment includes the rod wave guide in the form of a cylindrical rod having a diameter of 12 to 20 mm, preferably 14 to 18 mm.

A further aspect of the invention is a system for measuring the level of a liquid contained in a pressure vessel of a urea synthesis plant, according to the claims. The system comprises an emitter and a receiver connected to the rod wave guide. In some embodiments the emitter and a receiver are the same device (combined emitter/receiver).

The applicant has found that the use of a solid rod wave guide provides unexpected benefits, particularly in the presence of mist or foam over the liquid level. In addition, the applicant has found that relatively low frequencies provide a reliable, stable and precise measurement even in harsh conditions such as those in a supercritical or close to critical reactor.

It is believed that the reason is that the signal travels essentially on the surface of the solid rod wave guide. At the liquid surface, the signal is partially reflected back to the emitter through the same rod. The signal does not travel freely in the environment (that is in the gaseous phase above the liquid), which causes great energy dissipation in the prior art, and is not disturbed by the presence of mist or foam. Furthermore, the signal is not repeatedly reflected as in a hollow body. Accordingly, the method is more accurate and requires less energy compared to the prior art.

The invention uses a signal of a low frequency, for example as low as 100 MHz, compared to the prior art. The lower frequency corresponds to a greater wavelength and a greater wavelength decreases the interaction of the signal with the very fine liquid droplets of mist or foam above the liquid level. The effects of such interaction are most pronounced when the wavelength is comparable to the size of such droplets; by reducing the frequency and correspondingly increasing the wavelength, the invention provides that the signal is much less sensitive to such source of disturbance.

For example, a prior art radar system working at a high frequency greater than 10 GHz, for example 40 to 80 GHz, would have a wavelength of around 1 mm comparable to the size of mist or foam in a pressurized environment. A radar system according to the invention with a frequency of less than 1 GHz, for example 100 MHz, would have a wavelength greater than 1 meter, unable to interact with such mist or foam.

A further advantage of the invention is that it does not require the installation of a large item, such as a large hollow pipe, in the pressure vessel. A protective pipe may be installed around the rod wave guide in some embodiments, particularly when the rod has a considerable length, but is not an essential feature of the invention.

The method is applicable to various known reactors for urea and various urea processes, including inter alia the $CO_2$-stripping urea process and the ammonia-stripping or self-stripping process, which are described in the relevant literature.

The advantages will emerge even more clearly with the aid of the description below, relating to a preferred embodiment.

DETAILED DESCRIPTION OF PREFERRED EMBODIMENTS

Figure 1:
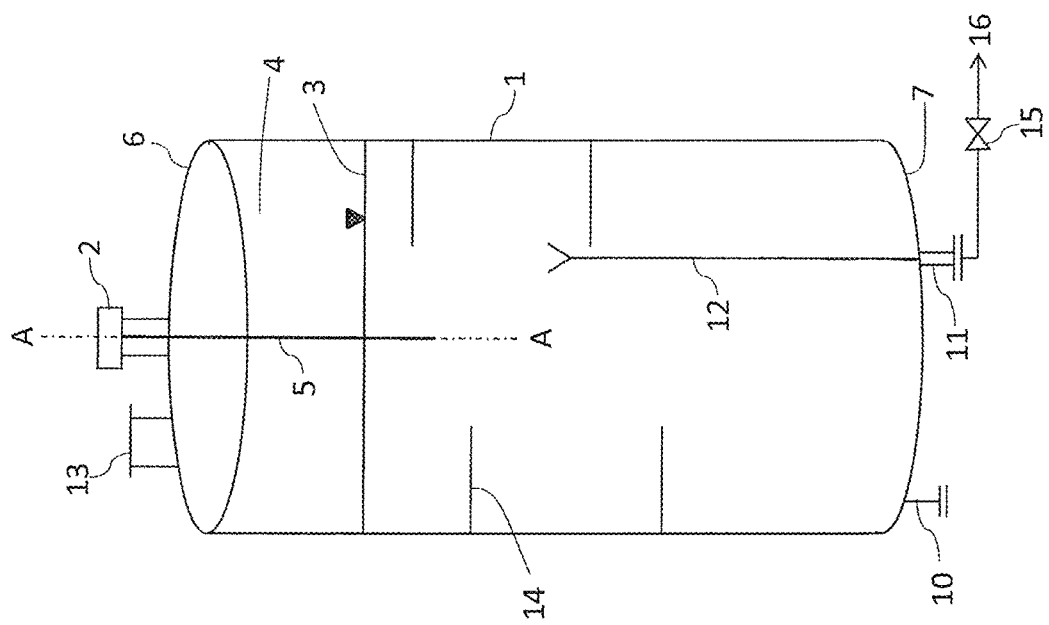
FIG. 1 illustrates a pressure vessel, namely a urea synthesis reactor, with a system for measuring a liquid level according to an embodiment of the invention.

FIG. 1 discloses a urea synthesis reactor comprising a pressure vessel 1 equipped with a liquid level measuring system according to an embodiment of the invention.

The liquid level measuring system comprises a combined radar emitter/transmitter device 2 installed on top of the pressure vessel 1.

The pressure vessel 1 contains a liquid up to a liquid level 3. The space 4 above the liquid level 3 contains a gaseous phase or supercritical fluid in equilibrium with the liquid below.

The combined device 2 includes both a radar emitter and a radar transmitter, and is connected to a rod wave guide 5 which is extended inside the reactor 1 to cover the level range to be measured. The distal end of the rod wave guide 5 is below the liquid level 3 and therefore the rod wave guide 5 is partially immersed in the liquid.

The transmitter of the device 1 emits microwaves travelling downward on the rod wave guide 5. When reaching liquid level 3, that is the liquid gas interface, the microwaves are reflected and travel back to the receiver of the combined device 2. The system then calculates the distance of the liquid level 3 from the emitter/receiver based on the elapsed time (time of flight of the signal), by means of a suitable processing unit. Said processing unit can be incorporated in the device 1.

The pressure vessel 1 has a cover 6 and a bottom 7. FIG. 1 further illustrates the following components of the pressure vessel 1: an inlet 10, a liquid outlet 11 connected to a downpipe 12, a gas outlet 13, a number of internal trays 14.

In operation, reactants (e.g. ammonia and carbon dioxide) are introduced through the inlet 10, a liquid product (e.g. urea solution) is withdrawn from the liquid outlet 11, and vapours are extracted from the gas nozzle 13. The flow rate through the liquid outlet 11 is regulated to keep a desired level 3 inside the reactor, for example to ensure a sufficient volume of the space 4, acting on a level control valve 15 on the line 16 connected to said outlet 11.

Figure 2:
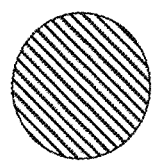
FIG. 2 illustrates some examples of a cross section of the rod wave guide of the system of FIG. 1.
Figure 2:
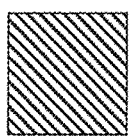
Figure 2:
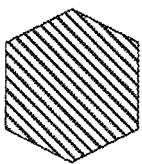

FIG. 2 illustrates exemplary cross sections of the rod wave guide 5, perpendicular to the axis A-A of FIG. 1. It can be seen that the rod wave guide 5 has a solid cross section; the figure illustrates examples of a cylindrical rod (a), square rod (b) and polygonal rod (c).

Figure 3:
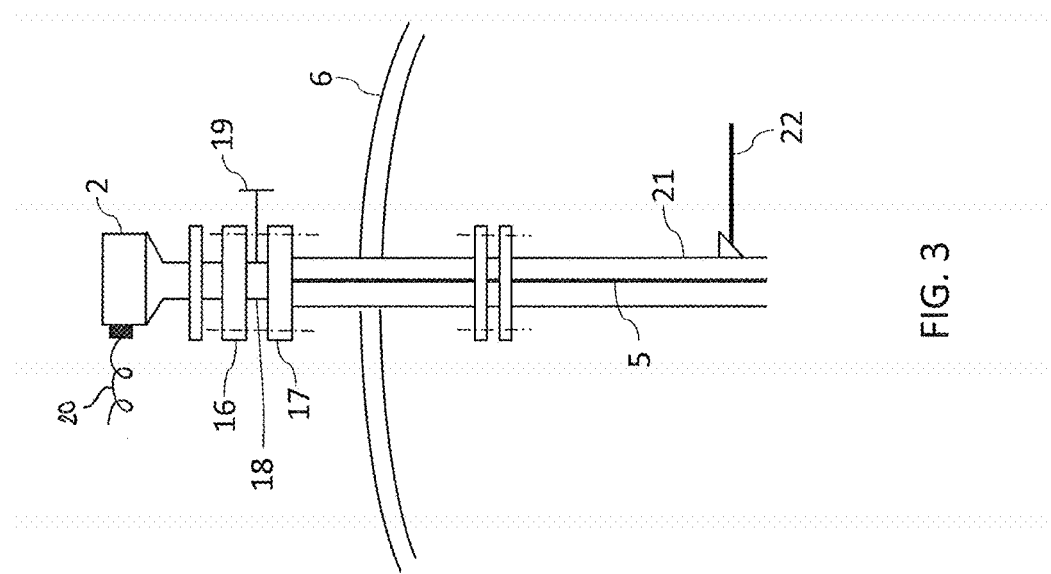
FIG. 3 illustrates a detail of connection of the system to a flange of a pressure vessel, according to an embodiment.

FIG. 3 illustrates an embodiment of installation of the radar device 2 on top of a pressure vessel.

The radar device 2 is assembled with a flange 16 to an equipment flange 17. A gasket ring 18 is inserted between the flanges for sealing purposes. The gasket ring 18, in an embodiment, includes a side branch 19 for injection of a flushing medium.

Injection of a flushing medium through the side branch 19 can be discontinuous, such as injection of steam condensate for washing purpose, or continuous such as injection of reagents (for example carbon dioxide or ammonia for urea synthesis). A continuous injection of a flushing medium can be applied to protect the rod wave guide 5 from a direct contact with aggressive environment and increase the life of the instrument.

The radar device 2 has a signal connection 20 for an output signal corresponding to the detected liquid level 3. In some embodiments, the radar device 2 may also include a finned body for cooling purpose.

FIG. 3 illustrates an embodiment including an optional outer pipe 21 around the rod wave guide 5. Preferably said outer pipe 21 is provided with holes for venting and draining and for pressure balancing. Said outer pipe 21 can have for example a diameter ranging from 25 to 100 mm, preferably 40 to 80 mm. The outer pipe 21 can be connected to one or more supports 22 fixed to the pressure vessel, or to suitable internals, to avoid vibration.

Figure 4:
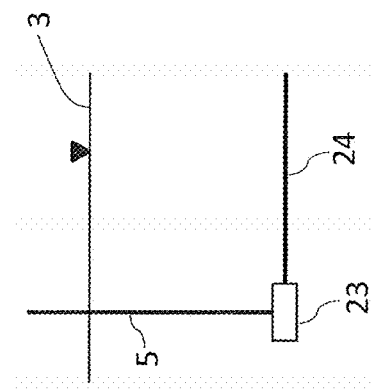
FIG. 4 illustrates a detail of a distal end of the rod wave guide, according to an embodiment.

As shown in FIG. 4, also the distal end of the rod wave guide 5 may be held by a support 23 made of a suitable material such as PEEK or Teflon®. This support 23 is connected to the vessel 1 by means of a beam 24.

The rod wave guide 5 is made of a suitable material according to the application. For example, if the pressure vessel 1 is an equipment of a urea plant, the rod wave guide 5 is preferably made of a urea-grade material such as super austenitic or super duplex stainless steel.

Figure 5:
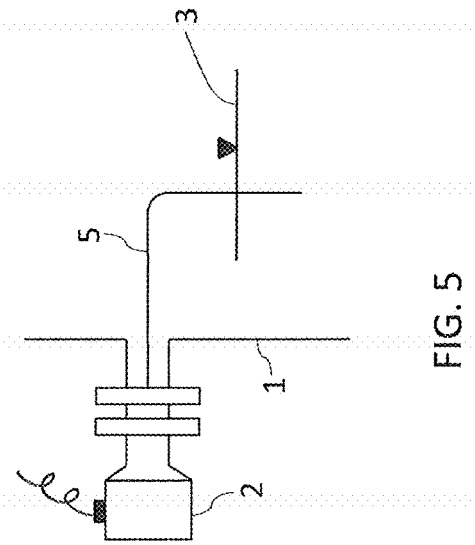
FIG. 5 illustrates another embodiment of the invention.

FIG. 5 illustrates a further embodiment wherein the rod wave guide 5 is curved. For example the rod 5 has a 90° bend. The bending radius is preferably 100 to 400 mm. In this embodiment the total length of the rod wave guide 5 is normally below 3000 mm and there is no need for the outer pipe. This embodiment with curved wave guide 5 is particularly preferred for the level control of high pressure urea strippers.

In some embodiments the rod wave guide 5 includes a source of a reference reflection above the liquid level, for example in the form of a step (change of diameter) above the liquid level. This reference reflection is used to calculate the actual speed of the signal influenced by the gaseous phase above the liquid level.

What is claimed is:

1. A method for measuring a liquid level in a pressure vessel of a urea synthesis plant, the method comprising:
   emitting a first electromagnetic signal from above the liquid level and towards the liquid level, over an outside surface of a wave guide, wherein said wave guide is an elongate solid rod, wherein the solid rod extends below the liquid level;
   detecting a second electromagnetic signal which is generated by the first signal reflected by the surface of the liquid;
   determining the liquid level on the basis of the elapsed time between the emission of the first signal and the detection of the second signal,
   wherein a gaseous phase contained in the pressure vessel above said liquid level, which is a gaseous phase including ammonia and carbon dioxide, has a pressure equal to or greater than 80 bar and a temperature equal to or greater than 120° C., wherein the determination of the liquid level comprises a step of a compensation of a dielectric of said gaseous phase.

2. The method according to claim 1, wherein said compensation includes the generation of a reference reflection at a known location of said rod above the liquid level, and calculation of the actual speed of the signal based on said reference reflection.

3. The method according to claim 2, wherein the reference reflection is generated by a change of diameter of the rod.

4. The method according to claim 1, wherein said first signal has a frequency of less than 1.5 GHz.

5. The method according to claim 4, wherein said first signal has a frequency of 100 MHz to 1.5 GHz.

6. The method according to claim 5, wherein said first signal has a frequency of 100 MHz to 1 GHz.

7. The method according to claim 1, wherein said rod wave guide is either straight or bended.

8. The method according to claim 7, wherein said rod wave guide is a curved rod with a 90° bend.

9. The method according to claim 1, wherein said gaseous phase has at least one of temperature and pressure above the critical value.

10. The method according to claim 1, the solid rod wave guide having a length of no more than 5 meters.

11. The method according to claim 10, the solid rod wave guide having a length of no more than 3 meters.

12. The method according to claim 1, said solid rod wave guide being a cylindrical rod.

13. The method according to claim 12, said rod having a diameter of 12 to 20 mm.

14. The method according to claim 13, said rod having a diameter of 14 to 18 mm.

15. The method according to claim 1, the pressure vessel being any of a high-pressure reactor, a high-pressure stripper or a high-pressure condenser of a urea synthesis plant.

16. The method according to claim 1, wherein said gaseous phase above the liquid level comprises ammonia and carbon dioxide.

17. The method according to claim 1, wherein said gaseous phase above the liquid level has a pressure equal to or greater than 120 bar, and a temperature of 140 to 210° C.

18. The method according to claim 17, wherein said gaseous phase above the liquid level has a pressure in the range 140 to 220 bar, and a temperature of 140 to 210° C.

19. A system for measuring a liquid level in a pressure vessel of a urea synthesis plant according to the method of claim 18, the system comprising an emitter, an elongate solid rod wave guide and a receiver, wherein:
   the emitter is located above the liquid level and is arranged to transmit a first electromagnetic signal over an outside surface of said elongate solid rod wave guide towards the liquid level;
   the rod wave guide extends from above the liquid level and has a bottom end below the liquid level;
   the receiver is arranged to detect a second electromagnetic signal which is generated by the first signal reflected by the surface of the liquid;
   the system outputs a measure of the liquid level determined on the basis of the elapsed time between the transmission of the first signal from the emitter and the detection of the second signal by the receiver, and
   the vessel operates at a pressure equal to or greater than 80 bar abs and a temperature equal to or greater than 120° C., and
   wherein the rod wave guide comprises at least one source for a reference reflection for the calculation of the actual speed of the signal in the gaseous phase above the liquid level.

20. The system according to claim 19, wherein the emitter and the receiver are part of a combined emitter/receiver.

21. The method according to claim 1, wherein said rod wave guide has a modular structure comprising several pieces.

* * * * *